Nov. 15, 1932.  A. LENNING  1,887,651
ABSORBER FOR AIR COOLED REFRIGERATORS
Original Filed Nov. 15, 1927  4 Sheets-Sheet 2

Inventor
Alvar Lenning
By
Wm. J. Hedlund
His Attorney

Nov. 15, 1932.　　　A. LENNING　　　1,887,651
ABSORBER FOR AIR COOLED REFRIGERATORS
Original Filed Nov. 15, 1927　　4 Sheets-Sheet 3

Inventor
Alvar Lenning
By
　　his Attorney

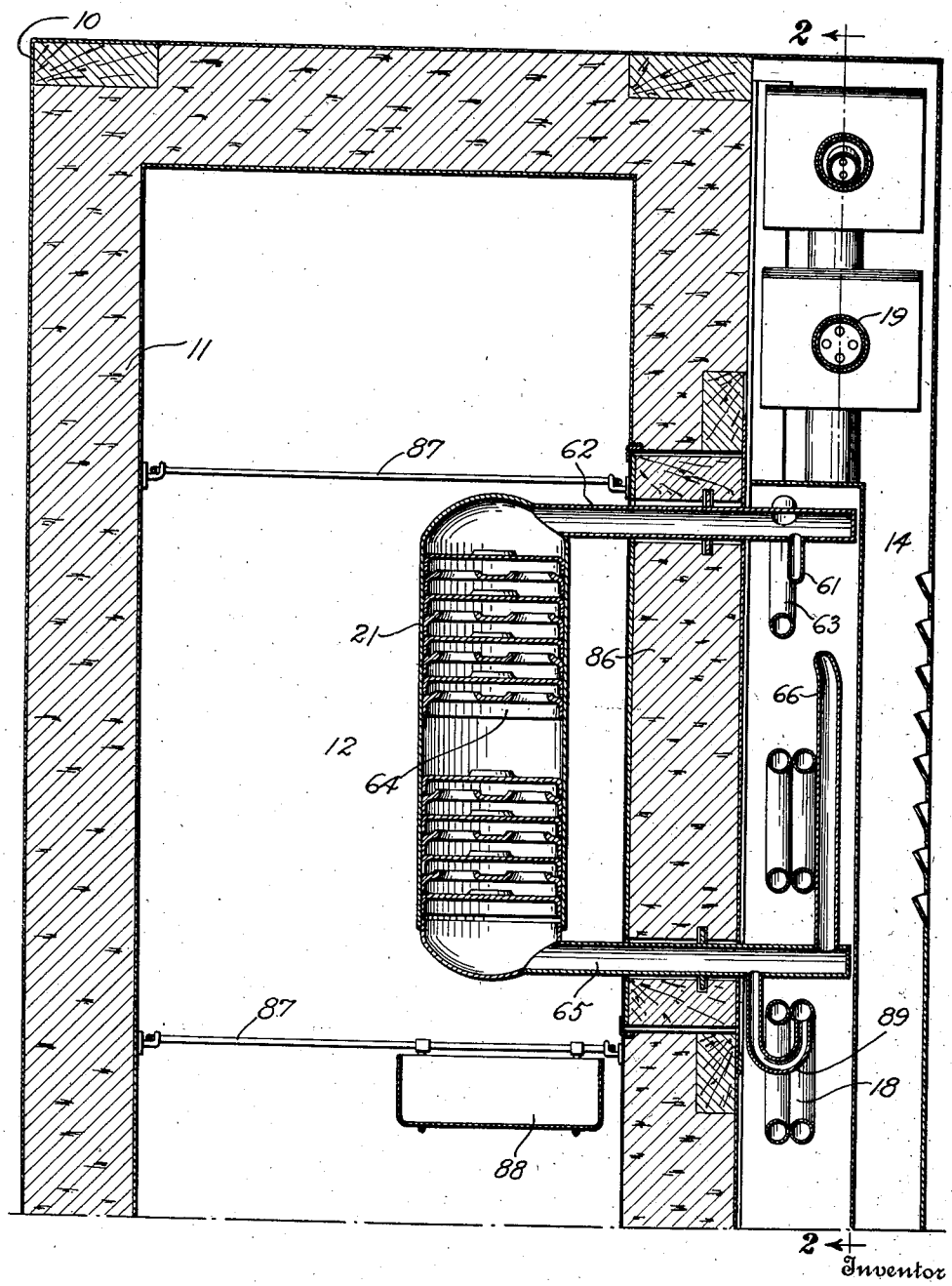

Patented Nov. 15, 1932

1,887,651

UNITED STATES PATENT OFFICE

ALVAR LENNING, OF NEW YORK, N. Y., ASSIGNOR TO ELECTROLUX SERVEL CORPORATION, OF NEW YORK, N. Y., A CORPORATION OF DELAWARE

ABSORBER FOR AIR COOLED REFRIGERATORS

Original application filed November 15, 1927, Serial No. 233,366. Patent No. 1,836,719, dated December 15, 1931. Divided and this application filed January 26, 1929. Serial No. 335,222.

This application is a division of my application Ser. No. 233,366 filed Nov. 15, 1927, issued as Patent 1,836,719 on Dec. 15, 1931.

The object of my invention is to provide an air cooled absorber for refrigerating apparatus of the absorption type which will operate efficiently. More particularly I aim to provide an air cooled absorber for absorption refrigerating apparatus of continuous type. Amongst the features of my invention are: a flue for cooling the absorber and condenser of an absorption machine arranged alongside the food space of a cabinet, the absorber being placed in a relatively low position and the condenser near the top of the flue; a grid surrounding the absorber for adequately cooling the absorber by air, which grid in effect is a part of the flue for causing air circulation; and a combined unit of high operating efficiency while eliminating cooling by liquid such as water; which features will hereinafter be more fully described.

Preferably my novel refrigerating apparatus is of the constant pressure continuous type wherein an auxiliary agent, in the presence of which the cooling agent (refrigerant) evaporates, circulates in a continuous cycle through the absorber and evaporator. In such cycle I provide further novel features as will be presently described. My invention is illustrated by means of the accompanying drawings of which:

—Fig. 1 and Fig. 2 make up a complete side view partly in cross-section by joining the figures on the dash-and-dot lines;

Fig. 4 is a cross-section taken on the line 4—4 of Fig. 2;—Figs. 3 and 4 when joined on the dash-and-dot lines make up a cross-sectional view of the combined refrigerator cabinet and refrigerating apparatus.

Figure 1:
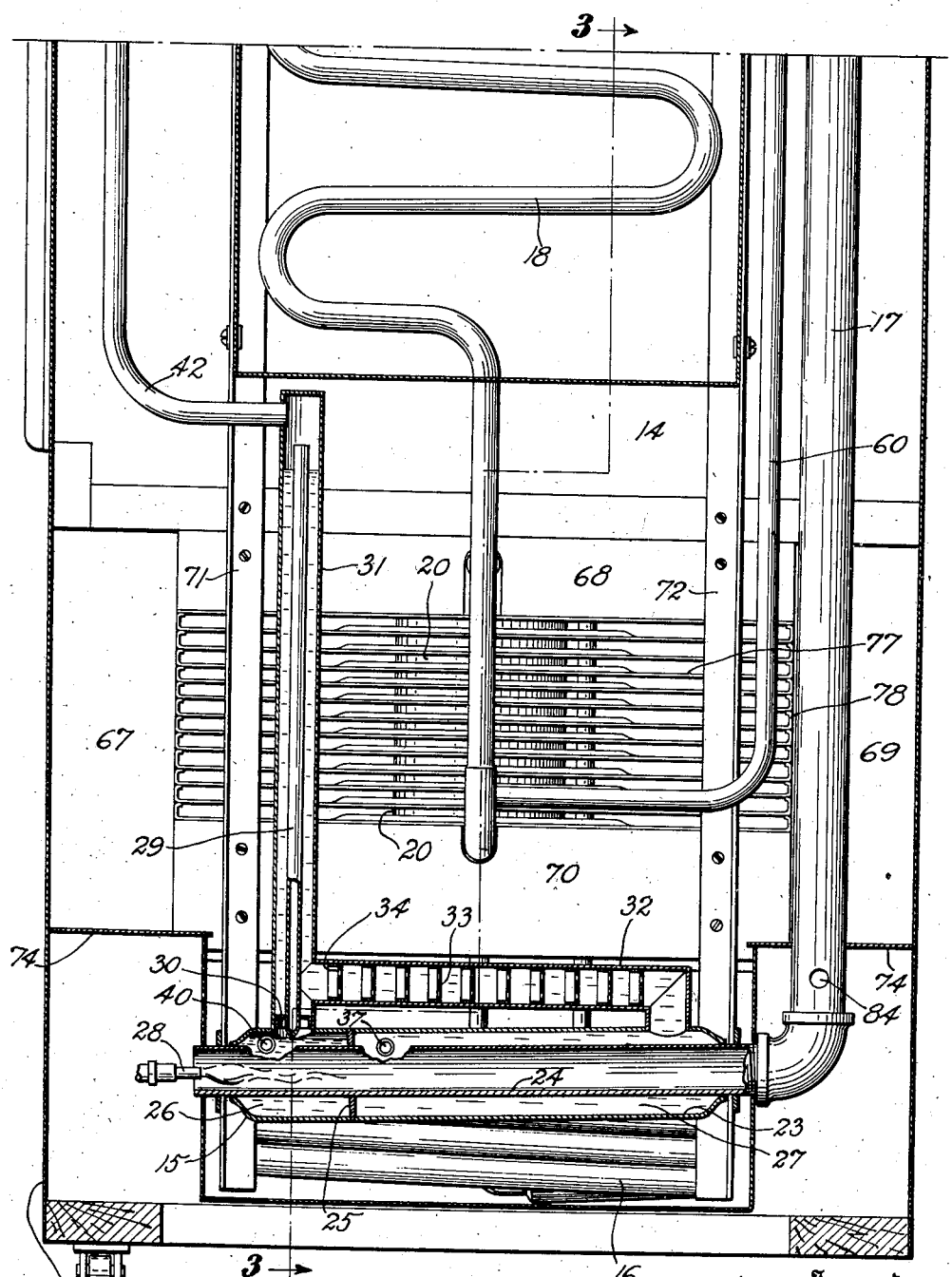
Fig. 1 is a lower half of the side view of the refrigerator built in accordance with my present invention, a portion of the casing being in cross-section to show parts of the refrigerating apparatus and parts of the refrigerating apparatus being shown in cross-section.
Figure 2:
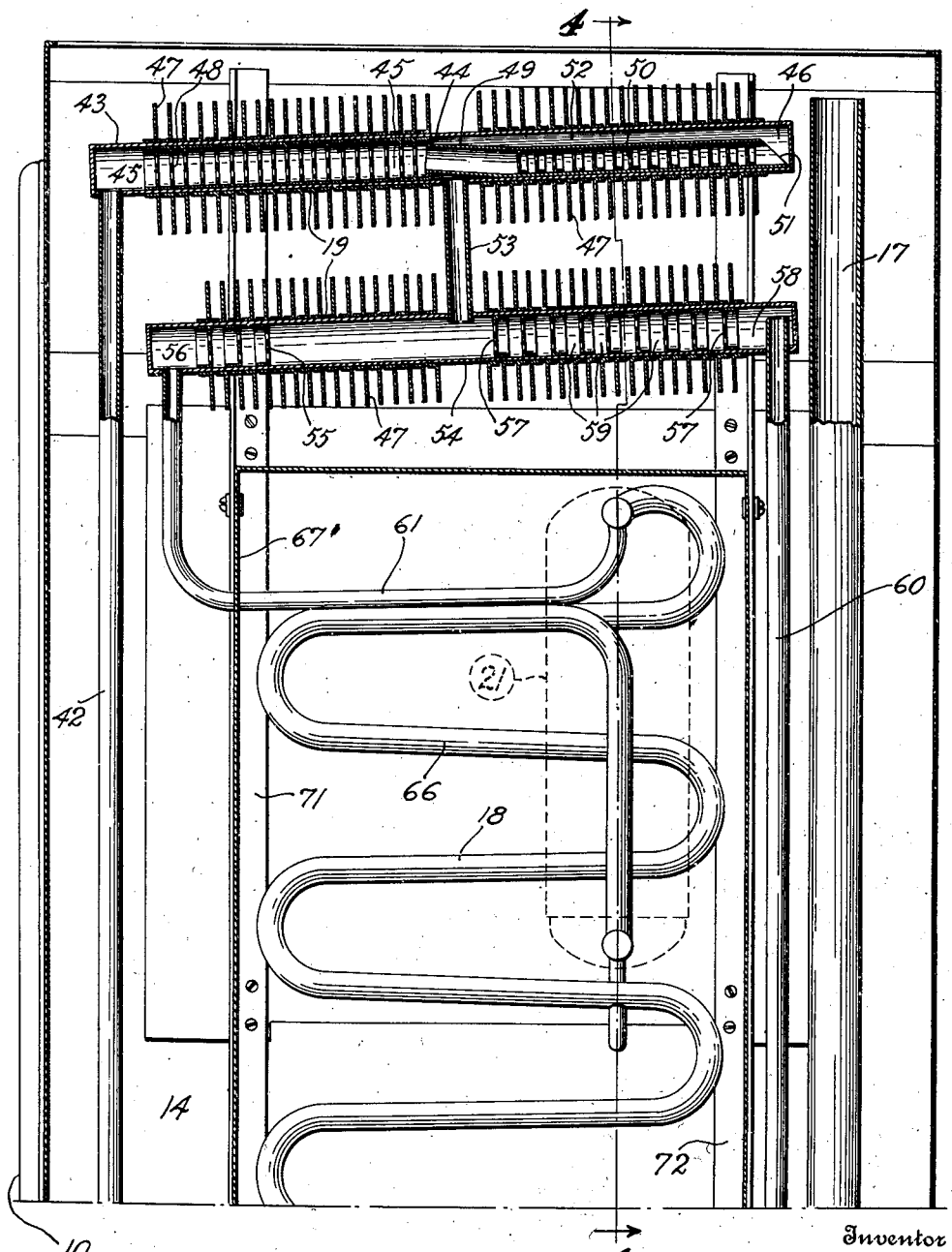
Fig. 2 is a top view of the nature of Fig. 1.

On the drawings, reference character 10 designates generally the refrigerator cabinet as a whole. A section of the cabinet is insulated by insulating material 11 to form food space 12. Below the food space is a compartment 13. To one side of the food space is a flue 14. Flue 14 extends from the bottom of the cabinet to the top and is open at the top.

The refrigerating apparatus comprises a generator 15, a liquid heat exchanger 16, an off-take duct for products of combustion 17, a gas heat exchanger 18, a condenser 19, an absorber 20, and an evaporator 21, these parts being suitably interconnected by conduits to form various cycles for flow of fluid.

The generator 15 is contained within a housing 22 which is filled with insulating material. It comprises a main shell 23 through which extends the heating tube 24. A partition 25 divides the generator proper into a strong liquid chamber 26 and a weak liquid chamber 27. A gas burner 28 projects into conduit 24 for heating the generator. The generator contains the cooling agent or refrigerant in solution. I prefer ammonia as the cooling agent dissolved in water as the absorption liquid. A riser pipe 29 is connected to strong liquid chamber 26, passes through a partition 30 and discharges into a stand pipe 31. The partition 30 separates stand pipe 31 from strong liquid chamber 26. Stand pipe 31 is connected at the bottom with weak liquid chamber 27 by means of conduit 32 containing discs 33 with apertures 34 in the same.

Liquid heat exchanger 16 includes an outer conduit 35 and an inner conduit 36. The outer conduit is connected at one end to weak liquid chamber 27 and at the other end to the upper part of the absorber by means of conduits 37 and 38 respectively. The inner conduit 36 is connected to the lower part of the absorber by means of conduit 39 and to the strong liquid chamber 26 by means of conduit 40.

Circulation of absorption liquid takes place between the generator and absorber as follows: Strong absorption liquid enriched in cooling agent passes out of the absorber through conduit 39, passes through conduit 36 and enters the strong liquid chamber 26 through conduit 40. From chamber 26 the liquid is lifted due to thermo-siphon action through riser pipe 29. The liquid in riser pipe 29 is partially vaporized by the heat supplied by the gas burner or other source of heat used and vapor and liquid pass through the riser pipe into stand pipe 31. I provide a thermo-siphon hole 41 in order to aid the percolating action. Liquid in stand pipe 31 passes downwardly therein and through conduit 32 into weak liquid chamber 27 where it is still further deprived of gaseous cooling agent which passes in counter-current to the liquid back through conduit 32 and through the liquid in the stand pipe and out at the top of the stand pipe through conduit 42. Discs 34 produce an analyzing action. Weak liquid leaves chamber 27 through conduit 37, passes through conduit 35, the outer conduit of heat exchanger 16, and through conduit 38 to discharge into upper part of the absorber.

Vapor passes through conduit 42 which is connected to the top of stand pipe 31 and upwardly to a hollow member 43 which, in the embodiment shown, consists of a cylindrical tube arranged near the top of flue 14 and inclined slightly from the horizontal so that liquid in the same may flow downwardly back toward conduit 42. Hollow member 43 constitutes a part of the condenser. Within hollow member 43 a partition 44 divides the same into a primary chamber 45 (so called because it is the first chamber of a series of condenser chambers) and rectifier chamber 46. The hollow member 43 is surrounded by a series of fins 47 which give a large surface for the cooling of the hollow member by surrounding air passing upwardly through flue 14. The fins are arranged substantially vertically. Within chamber 45 is a series of baffling members 48 which have holes in the same for passage of gas and which may be cut away at the bottom to form a channel for flow of liquid along the bottom of hollow member 43 toward conduit 42. Holes may be used in baffles 48 without cuts in the edges to form a channel, in which case liquid will accumulate to the heights of the lowermost holes. This will not vary the function. Primary chamber 45 is a rectifying chamber. Here absorption liquid entrained with the vapor of the cooling agent is condensed due to the cooling action of the surrounding air and flows backwardly toward the generator. Vapor of the cooling agent passes through an opening in partition 44 in which is fitted one end of a conduit 49 which passes within chamber 46 and in contact with the bottom thereof. Conduit 49 contains discs 50 which also have apertures in them. Conduit 49 is smaller than hollow member 43 and leaves a vapor space surrounding the same within chamber 46. The higher end is open at 51 and vapor of the cooling agent passes into chamber 46 around the conduit 49. The space or chamber around conduit 49 is indicated by reference character 52. Vapor condenses in chamber 52 due to the cooling action of the surrounding air and heat transmission by means of fins 47 and the condensed cooling agent flows along the bottom of chamber 52 in contact with the outside of conduit 49. This liquid cools the gaseous fluid within conduit 49 and precipitates out further absorption liquid which flows backwardly toward the generator. Some of the cooling agent is evaporated due to the heating effect of conduit 49 but it again condenses in the space 52. Liquid after rectification leaves chamber 52 through duct 53 and enters an intermediate space in a second hollow member 54 which also is surrounded by fins 47 and which also is, in the embodiment shown, formed as a hollow cylinder and inclined slightly from the horizontal. There are two sets of discs in hollow member 54: one, at the left as shown, lettered 55, which forms a precooling chamber 56 at the left hand end, as shown, of the hollow member 54; and, a second set of discs 57 which forms an extension chamber between the remote discs 57 and at the right hand end of which, as shown, is a vent chamber 58. Discs 55 and 57 are similar to discs 48 and have apertures in the same. The inclination of member 54 is downwardly from the vent chamber to the precooling chamber.

Liquid cooling agent passes downwardly through duct 53 and some vapor passes with it. There is further condensation in hollow member 54. If the load is great, condensation takes place within the extension chamber between discs 57. The extension chamber is indicated by reference character 59. The greater the amount of vapor passing through duct 53, the greater is the portion of chamber 59 which is used for condensation. It is thus seen that there is provided a condenser of variable capacity for different loads. The particular condenser shown is intended for operation with a system having inert gas in the presence of which the cooling agent evaporates. Some of this inert gas is entrained with absorption liquid, is driven out in the generator and passes to the condenser. This inert gas passes downwardly through duct 53 and some of it passes into chamber 56. Assuming that this inert gas is hydrogen and that the cooling agent is ammonia, hydrogen being in the presence of ammonia in chamber 56 is saturated with ammonia. There is thus an atmosphere in which condensation can not take place. This atmosphere acts as a sort of cushion through which the liquid cooling agent must flow. Since there is a cooling of this chamber, the liquid cooling agent is cooled to a temperature which is in the liquid region of the Mollier diagram. Thus there is precooling of the cooling agent before it enters the evaporator. Hydrogen gas works past discs 57 and into vent chamber 58 and thence passes through vent pipe 60 to be conveyed into evaporator-absorber cycle. It will be seen that the hollow members 43 and 54 are superposed one above the other in the flue 14, the arrangement being such that the draft passes first past the colder member 54 and then the hotter member 43.

Liquid leaving the precooling chamber 56 passes through conduit 61 and into conduit 62, whence it flows into the evaporator shell 21.

In the apparatus as built for use, a casting of aluminum or other heat transmitting material with large surface would be placed around evaporator 21, such casting containing suitable pockets for ice trays.

The auxiliary agent, preferably hydrogen, is introduced into conduit 62 from conduit 63. In the evaporator the ammonia diffused into the hydrogen passes from liquid to gaseous form as a result of which heat is taken up from the surrounding objective of refrigeration which, in the instant case, is the food space of the cabinet. The evaporator contains a series of discs 64 for distributing liquid and for obtaining a large surface of gas and liquid contact. The gas mixture formed in the evaporator passes out through conduit 65 at the bottom of the evaporator and then passes through conduit 66. Conduit 63 forms one space and conduit 66 a co-operating space of heat exchanger 18. These two conduits are arranged in solder contact one alongside the other and are arranged in zig-zag formation within a casing or compartment 67' which is filled with insulating material. It will be noted that a high, long heat exchanger is produced by this arrangement which contains only single passages for each fluid, which is simple in manufacture and which has excellent heat transfer. Conduit 66 is carried in an upwardly extended loop from conduit 65 in order to obtain an extended heat exchange surface. Conduit 66 is connected to the bottom part of the absorber and conduit 63 is connected to the upper part of the absorber. Conduit 38 is connected to conduit 63 and vent pipe 60 is connected to the lower part of conduit 66.

Figure 3:
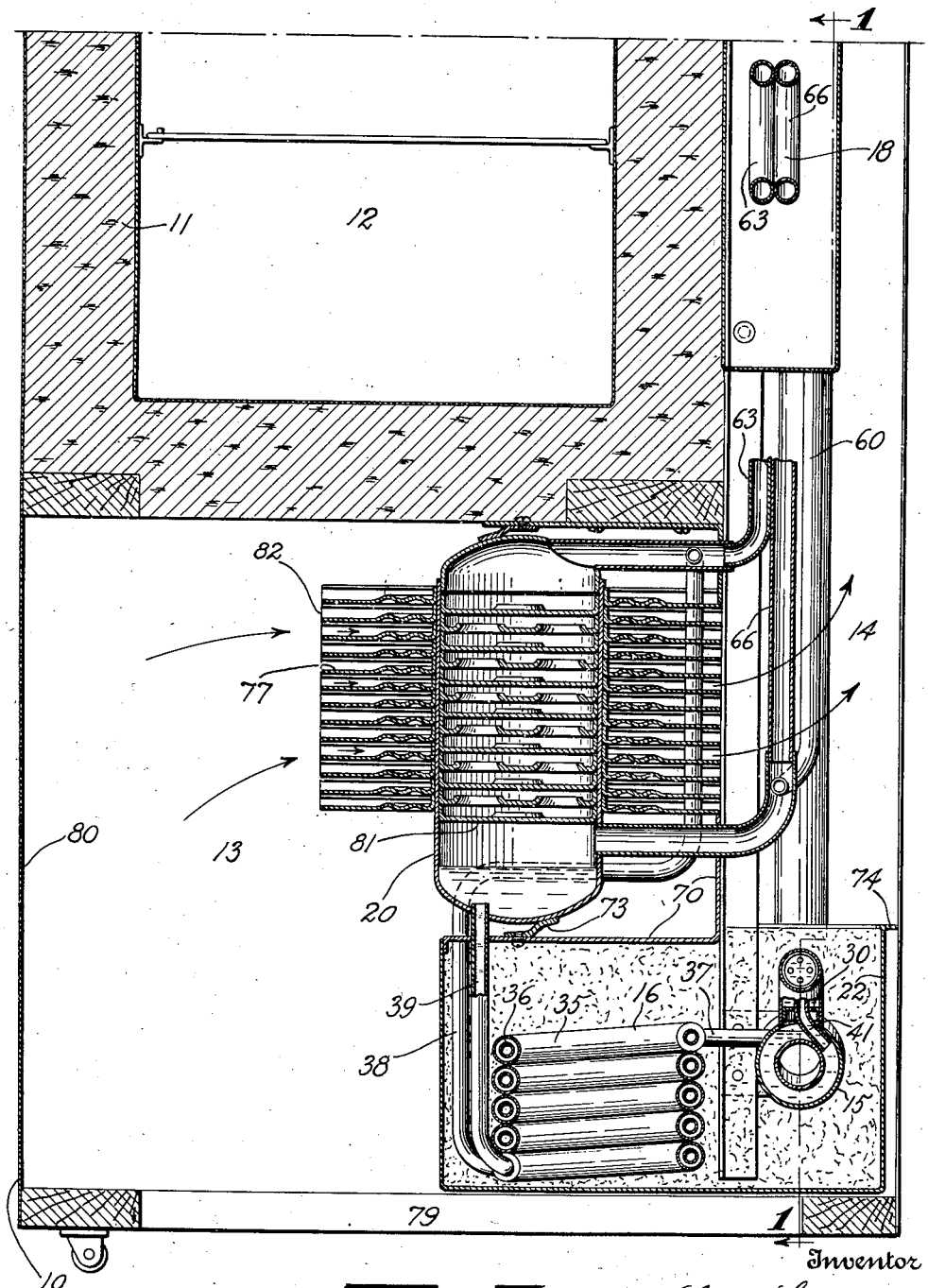
Fig. 3 is a cross-section taken on the line 3—3 of Fig. 1.

By placing absorber 20 within chamber 13 below the food space the greatest portion of the upper part of the cabinet is used for food space which is a convenience to the user. Furthermore, this arrangement gives an improved cooling effect with air. Referring to Figure 3, the right hand wall of the outside of the insulation extends vertically. The flue 14 is to the right of this. A series of plates 67, 68, 69 and 70 (Fig. 1) are in line with this right hand wall. Of these plates, those lettered 68 and 70 are fastened to angle-irons 71 and 72 which extend upwardly along the wall referred to and to which the casing 67' is secured. A plate 74 extends horizontally at the top of casing 22. A plate may be placed on the top of casing 22 or the insulating material within the same may give a surface at the top of this casing. This provides a horizontal floor for flue 14. Plate 70 is bent horizontally as shown in Fig. 3 to form the top of a compartment containing the heat exchanger 16 which is also filled with heat insulating material. The absorber is in part supported on this plate by means of the member 73. A similar member at the top of the absorber serves as a second support.

Between plates 68 and 70 and between plates 67 and 69 (these plates are in the same plane or substantially the same plane as above described) there is a rectangular opening. Through this opening as viewed in Fig. 1 can be seen a grid arrangement of parallel plates 77. These plates are placed horizontally and surround absorber 20. They may be shrunk onto the absorber or otherwise firmly contacted with the absorber to give good heat transfer. This grid surrounding the absorber may be said to be set into or against the lower opening of flue 14. All the air entering flue 14 must pass between the plate members 77 of the grid. The plates 77 are bent at each side as indicated at 78 to form walls extending vertically along each side of the grid. The grid in effect makes up a box extension to the flue 14 divided into a series of parallel passages into which the absorber is set. The uppermost and the lowermost of the horizontal plates 77 and the flanges 78 forming the vertical walls on each side of the grid, together with the plates 67, 68, 69 and 70, form an air-passageway adjacent the absorber shell which is divided into parallel horizontal passages by the intermediate plates 77. The air may enter chamber 13 either through the bottom opening 79 or through louvers arranged in plate 80. The absorber contains a series of discs 81 which distribute liquid within the absorber and act to transmit heat. These discs are tightly arranged against the inner surface of the absorber shell opposite the grid plates 77.

The air enters the open end of the boxlike grid indicated by reference character 82 in Fig. 3, flows through the parallel passages between the grid plates and into flue 14 and upwardly through flue 14. The circulation of the air through the flue is caused by the heat supplied by the absorber and by the condenser. The air in flue 14 will become very much hotter than air outside the refrigerator and there will be set up a continuous flow of air past the absorber upwardly through flue 14 and past the condenser. The conduit 17 for products of combustion also passes upwardly through flue 14. In this conduit at the bottom is a draft hole 84.

The arrangement is such that the refrigerating apparatus may be made as a unit independently of the cabinet and may be inserted into the cabinet from the side. For assembly, section 86 of the side wall is made separately, built onto the apparatus and set into an opening in the side wall made for the same when the apparatus unit is fitted to the cabinet. The cabinet is provided with suitable shelves 87 and defrosting pan 88.

A conduit 89 conducts any unevaporated liquid which passes to the lower part of the evaporator into heat exchanger conduit 66 which is the heavy gas line. The circulation of hydrogen between evaporator and absorber is effected continuously due to the difference in specific weight of the mixture of gases in the evaporator and in conduit 66 against the lighter gas in the absorber and in conduit 63.

The whole apparatus is made of metal.

It will be evident that the flue can be on the back of the cabinet instead of the side and the apparatus built to be fitted in from the back without altering the structural make-up.

While I have described one form of my invention, it will be understood that I am not limited to the form shown but that many variations may be made within the spirit and scope of the invention.

What I claim is:

1. An absorber for a refrigerator adapted to be cooled by air comprising a shell, means for introducing vaporous refrigerant and liquid absorption fluid into said shell, a series of discs in said shell in contact with the inner surface of said shell and adapted to be contacted by said refrigerant and absorption fluid, and a series of plates surrounding said shell arranged in parallel to form a series of parallel air passages past the absorber and means for closing two sides of said passages.

2. An absorber for a refrigerator adapted to be cooled by air comprising a cylindrical shell, a series of discs in said shell in contact with the inner surface of the shell, and a series of plates surrounding the absorber forming a grid, the plates being in close contact with the outside of the shell and being bent to close two sides of the grid to form a confined air passageway past the absorber divided into a plurality of parallel passages.

3. An absorber for a refrigerator adapted to be cooled by air comprising a shell, means for introducing vaporous refrigerant and liquid absorption fluid into said shell, heat transfer means in said shell in contact with the inner surface of the shell and adapted to be contacted by said refrigerant and absorption fluid, means forming an air-passageway adjacent said shell and means dividing said passageway into a plurality of parallel passages.

4. An absorber for a refrigerator adapted to be cooled by air comprising a shell, means for introducing vaporous refrigerant and liquid absorption fluid into said shell, heat transfer means in said shell in contact with the inner surface of the shell and adapted to be contacted by said refrigerant and absorption fluid, means forming an air-passageway adjacent said shell and means comprising heat transfer members dividing said passageway into a plurality of parallel passages.

5. An absorber for a refrigerator adapted to be cooled by air comprising a shell, means for introducing vaporous refrigerant and liquid aborption fluid into said shell, heat transfer means in said shell in contact with the inner surface of the shell and adapted to be contacted by said refrigerant and absorption fluid, means forming an air-passageway adjacent said shell and means comprising heat transfer members dividing said passageway into a plurality of parallel passages, said members being in close contact with the outside of the shell.

6. An absorber for a refrigerator adapted to be cooled by air comprising a shell, means for introducing vaporous refrigerant and liquid absorption fluid into said shell, heat transfer means in said shell in contact with the inner surface of said shell and adapted to be contacted by said refrigerant and absorption fluid, means forming an air-passageway adjacent said shell and means secured to said shell providing a large heat transfer surface and a low resistance to the flow of air through said air-passageway.

7. An absorber for a refrigerator adapted to be cooled by air comprising a shell, means for introducing vaporous refrigerant and liquid absorption fluid into said shell, heat transfer means in said shell in contact with the inner surface of said shell and adapted to be contacted by said refrigerant and absorption fluid, means forming an air-passageway adjacent said shell and means secured to said shell providing a large heat transfer surface and a low resistance to the flow of air through said air-passageway, said means comprising parallel plates dividing said air passageway into a plurality of passages.

8. An absorber for a refrigerator adapted to be cooled by air comprising a shell, means for introducing vaporous refrigerant and liquid absorption fluid into said shell, heat transfer means in said shell in contact with the inner surface of said shell and adapted to be contacted by said refrigerant and absorption fluid, means forming an air-passageway adjacent said shell and means secured to said shell providing a large heat transfer surface in said air-passageway.

9. An absorber for a refrigerator adapted to be cooled by air comprising a shell, means for introducing vaporous refrigerant and liquid absorption fluid into said shell, heat transfer means in said shell in contact with the inner surface of said shell, and adapted to be contacted by said refrigerant and absorption fluid, means forming an air-passageway adjacent said shell and means secured to said shell providing a large heat transfer surface in said air-passageway, said means comprising parallel plates dividing said air-passageway into a plurality of passages.

10. An absorber for a refrigerator adapted to be cooled by air comprising a shell, conduits for introducing vaporous refrigerant and liquid absorption fluid into said shell, heat transfer means in said shell in contact with the inner surface of the shell and adapted to be contacted by said refrigerant and absorption fluid, members forming an air-passageway adjacent to said shell, and a housing for containing and supporting said absorber and the aforesaid members forming the air-passageway, said absorber, conduits and members being removable from the housing as an integral structure.

11. An absorber for a refrigerator adapted to be cooled by air comprising a shell, conduits for introducing vaporous refrigerant and liquid absorption fluid into said shell, members forming an air-passageway adjacent to said shell, and a housing for containing and supporting said absorber and the aforesaid members forming the air-passageway, said absorber, conduits and members being removable from the housing as an integral structure.

12. An absorber for a refrigerator adapted to be cooled by air comprising a shell, conduits for introducing vaporous refrigerant and liquid absorption fluid into said shell, members forming a horizontal air-passageway adjacent to said shell, and a housing for containing and supporting said absorber and the aforesaid members forming the air-passageway, said absorber, conduits and members being removable from the housing as an integral structure.

13. An absorber for a refrigerator adapted to be cooled by air comprising a shell, conduits for introducing vaporous refrigerant and liquid absorption fluid into said shell, members forming an air-passageway adjacent to said shell, heat transfer members secured to said shell and dividing said passageway into a plurality of parallel passages, and a housing for containing said absorber, the members forming the air-passageway and the members dividing the passageway, said absorber, said conduits and said members being removable from the housing as an integral structure.

14. An absorber for a refrigerator adapted to be cooled by air comprising a shell, means for introducing vaporous refrigerant and liquid absorption fluid into said shell, heat transfer means in said shell in contact with the inner surface of the shell and adapted to be contacted by said refrigerant and absorption fluid, means defining an air-passageway adjacent to said shell and means for causing air to flow in a horizontal direction through said passageway past said shell.

In testimony whereof I have affixed my signature.

ALVAR LENNING.